INVENTORS
DANIEL SCHIFF
HOYT CLARKE HOTTEL, JR.
BY
Nolte & Nolte
ATTORNEYS

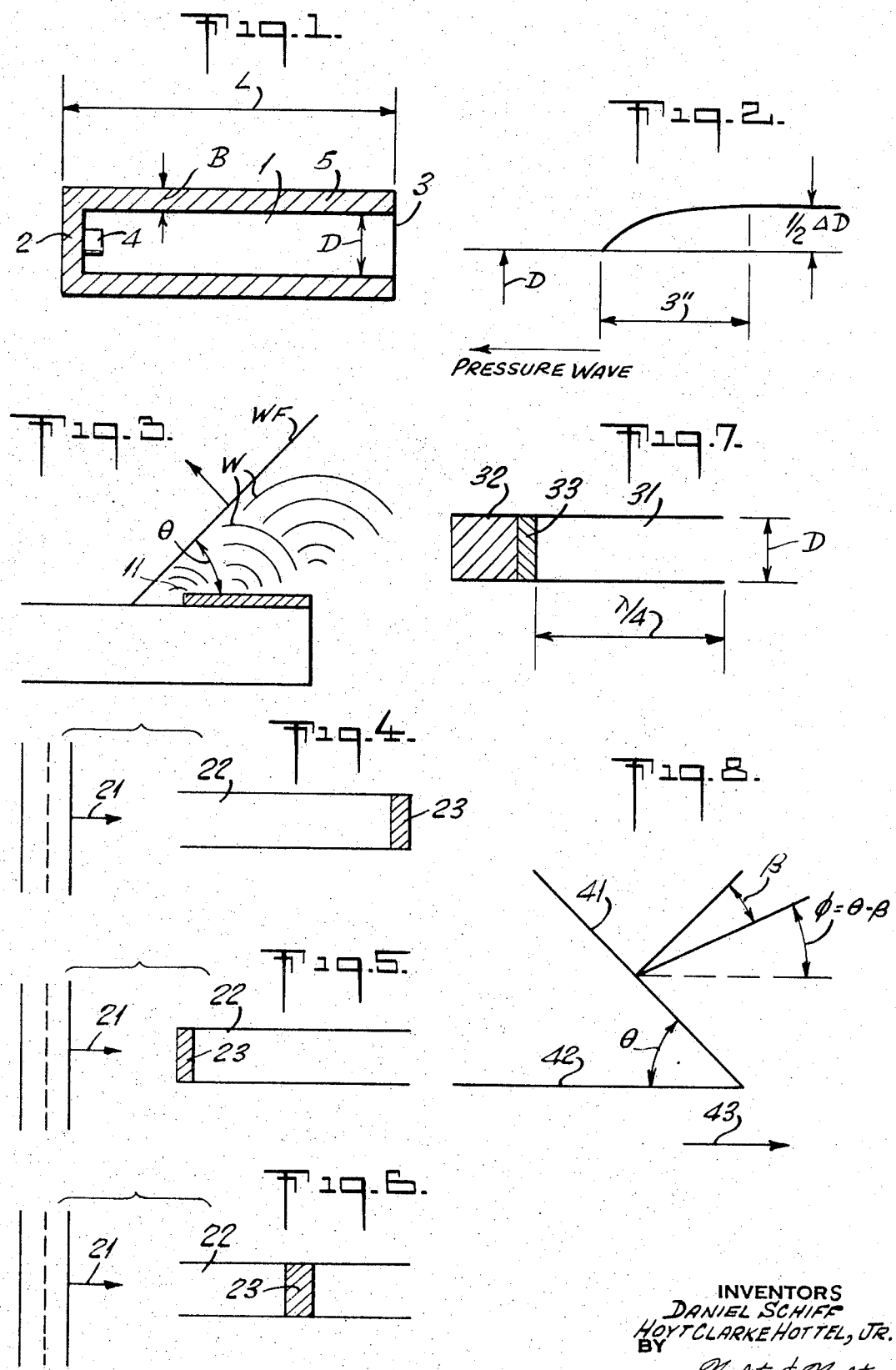

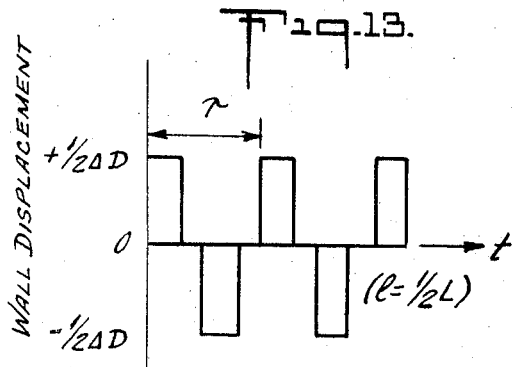
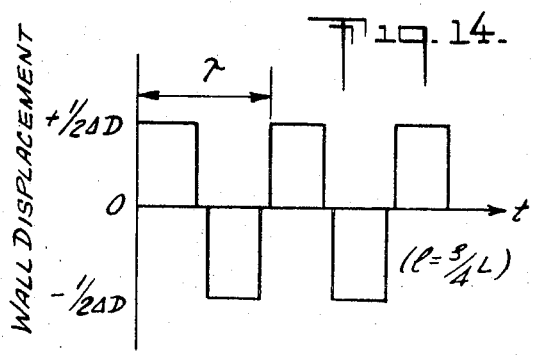
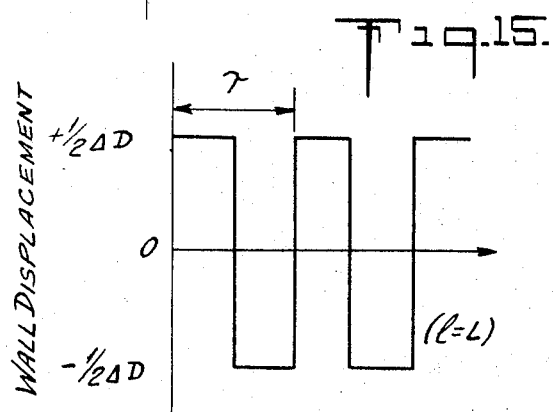
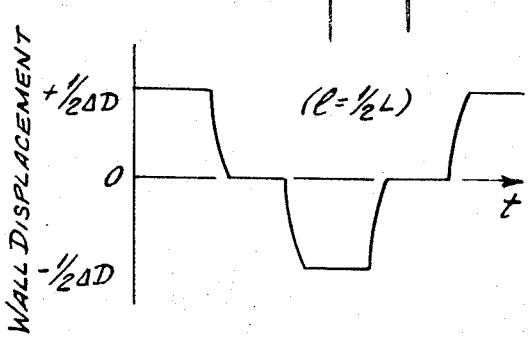
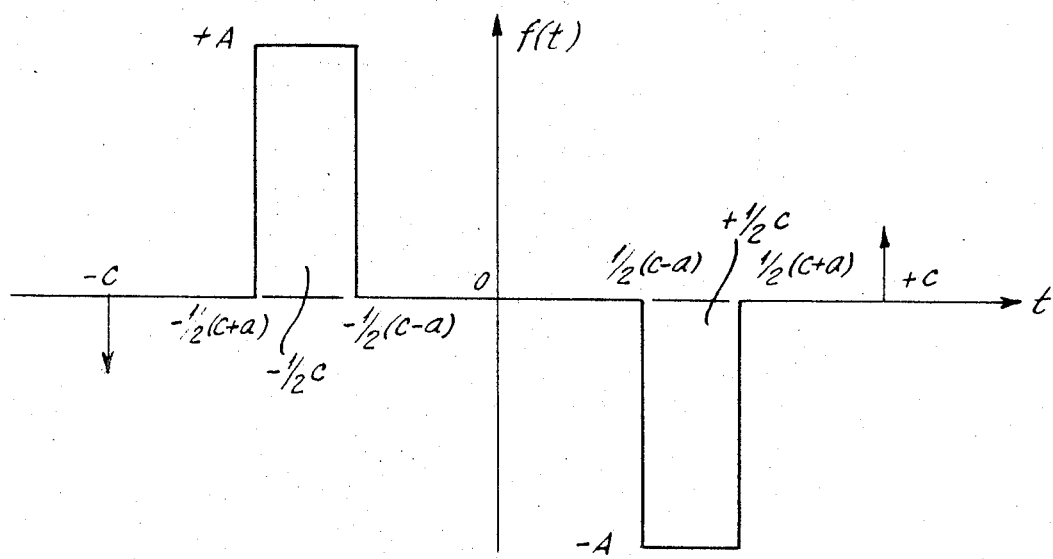

Jan. 5, 1971   D. SCHIFF ET AL   3,553,639
EXPENDABLE SONAR SOURCE
Filed Aug. 9, 1968   7 Sheets-Sheet 5

INVENTORS
DANIEL SCHIFF
HOYT CLARKE HOTTEL, Jr
BY
Nolte & Nolte
ATTORNEYS

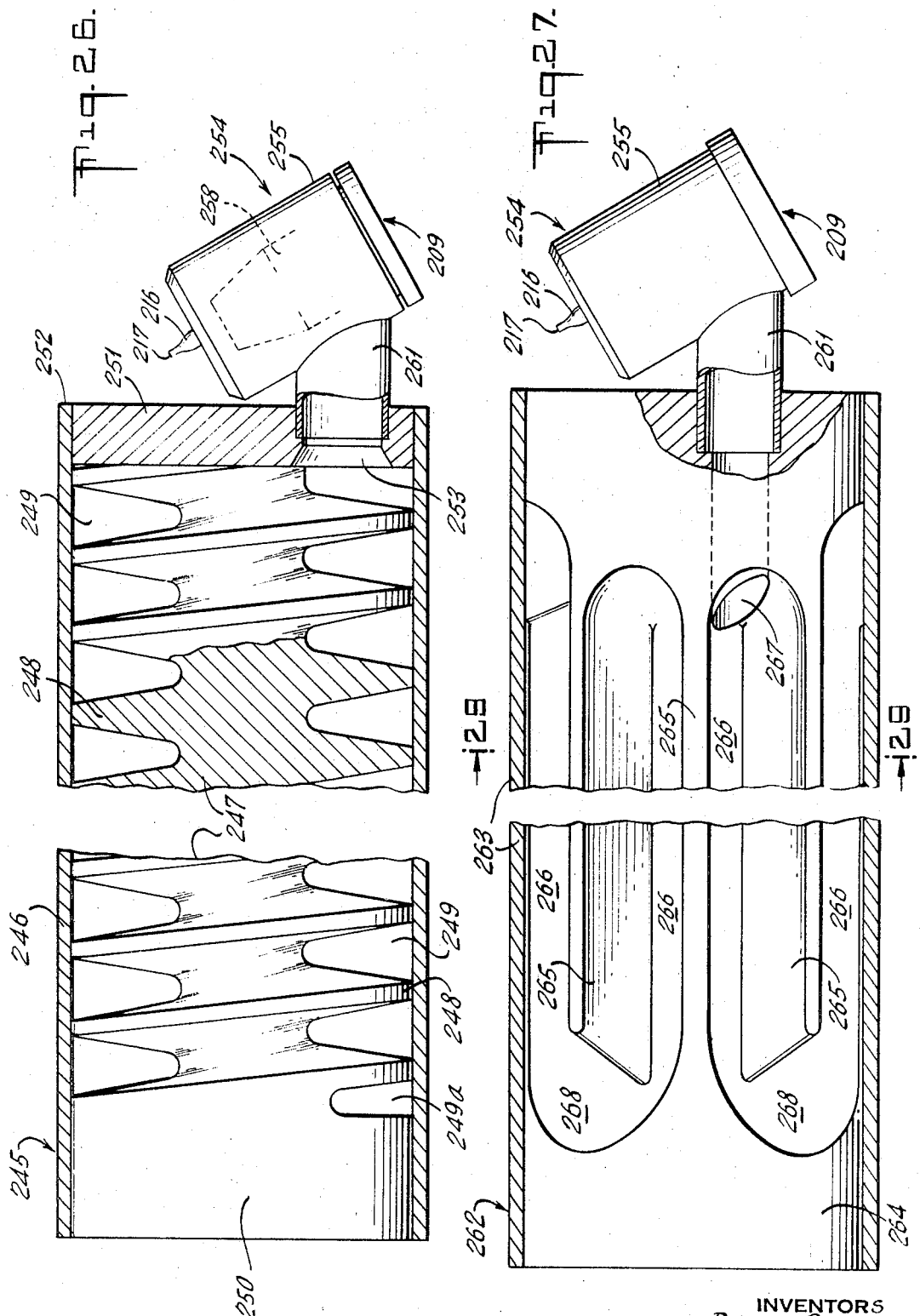

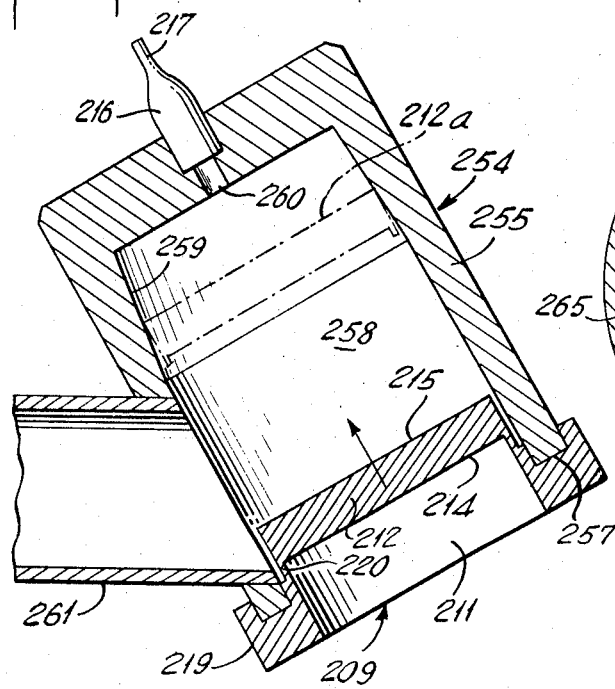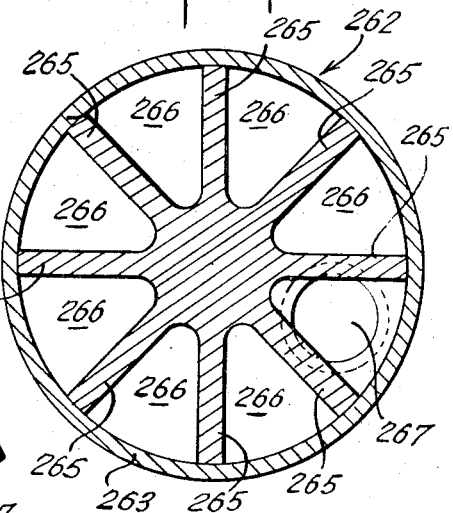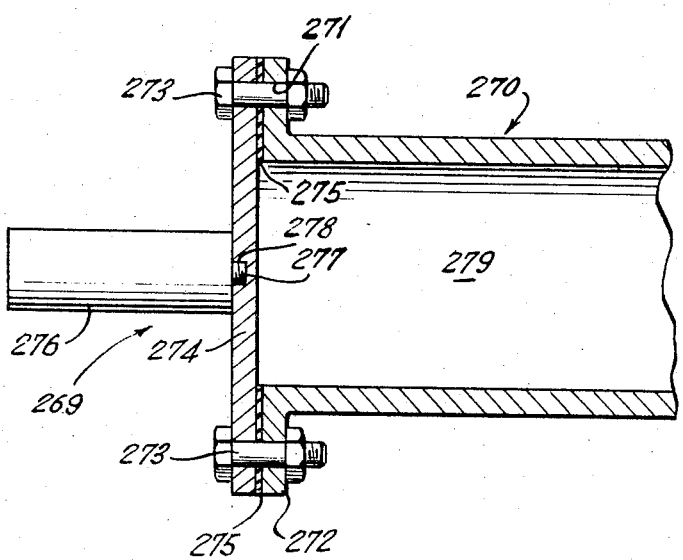

United States Patent Office 3,553,639
Patented Jan. 5, 1971

3,553,639
EXPENDABLE SONAR SOURCE
Daniel Schiff, Framingham, and Hoyt Clarke Hottel, Jr., Marion, Mass., assignors to Buzzards Corp., Marion, Mass., a corporation of Massachusetts
Continuation-in-part of application Ser. No. 635,141, May 1, 1967. This application Aug. 9, 1968, Ser. No. 751,591
Int. Cl. H04r 23/00
U.S. Cl. 340—12                  7 Claims

ABSTRACT OF THE DISCLOSURE

The present invention includes a hollow pipe of predetermined length extending between an open and a closed end, and a frangible rupture disc assembly secured to the open end.

---

This is a continuation-in-part of our co-pending application, Ser. No. 635,141, filed May 1, 1967.

FIELD OF THE INVENTION

This invention relates to sonar sources and more particularly to an expendable sonor source for producing a coherent signal by the phenomenon of water hammer.

BACKGROUND OF THE INVENTION

Sonar sound sources and transducers are known to the art and are conventionally of the electro-acoustic-type. Such electro-acoustic types sources are generally either magneto-strictive or electro-strictive. In these types of devices, power conversion properties manifest themselves in ships' shaft power being converted by an electric generator (60 or 400 c.p.s.); thereafter 60 or 400 c.p.s. to sonar frequency (1 kc. to 10 kc.); thence from electrical sonar frequency to mechanical sonor frequency; and finally from mechanical energy transducer to sound in water. We thus have conversions from mechanical energy to electrical energy, electrical energy to another form of electrical energy, the second form of electrical energy to mechanical energy and finally from mechanical energy to sound or sonar energy.

The efficiency of such devices is low, and the mass, volume, and costs are undesirably high. Poor reliability often results in difficult repairs.

Hydro-acoustic transducers have been proposed which depend on electrically driven motors and pumps as well as electro-mechanical switching at the required frequency. Among these are transducers which operate on a fluid amplifier principles and resonant cavity principles. However, tests on such proposed transducers have yielded undesirable results with a consequential reliance on the conventional electro-acoustic type of transducer.

Other undesirable characteristics that exist with electro-acoustic transducers include cavitation, which limits power output and damages the transducer elements. Excessive stresses induced in the transducer element may also result in damage. Other sonar sound sources which heretofore have been undesirable for use include explosive sources and mechanical clappers or vibrators.

SUMMARY OF THE INVENTION

A principal object of the present invention is to provide a new and improved expendable high power sonor source which produces a coherent sonar signal.

It is an object of the present invention to provide an improved apparatus and method for producing such sound signal.

It is another object of the present invention to provide an improved apparatus and method for receiving sound.

A still further object of the present invention is to provide a coherent expendable sonor source wherein extensional pipe characteristics are responsible for the generation of sound waves, and predetermined phenomenon such as water hammer initiate the extensional effects.

Another object is to provide predetermined means for initiating the water hammer phenomenon of the preceding paragraph, such means including membrane rupture, valve closure, explosive discharge, implosion, mechanical wave propagation, etc. Such means may be used to initiate the extensional pipe effects apart from and independent of water hammer.

Yet another object is to provide a coherent expendable sonar source wherein water hammer is initiated, apart from pipe extensional effects, for producing sound.

A yet further object of the present invention is to provide an expendable transducer.

Another object of the present invention is to provide a transducer for use in a liquid atmosphere.

The sonor source of the present invention attains the foregoing objects and overcomes limitations and disadvantages of prior art solutions to problems. The acoustic output of the sonar source of the present invention consists primarily of a single frequency although it is within the scope of this invention to produce two or more dominant frequencies. The sonar source of the present invention may be utilized to produce one or more acoustic pulses of determined duration and determined pulse spacing and is especially adapted for use in an Explosive Echo Ranging (or EER) system wherein the narrow bandwidth of said sonar source permits signal processing which is not possible with a broad band explosive source.

In accordance with the present invention, the sonor source converts the energy of a broad band explosion into a single frequency with high efficiency, effectiveness and reliability. A conduit or pipe configuration is used with fluids flowing therein at a predetermined velocity. By establishing a predetermined relationship between the length of the conduit or pipe to be used and the velocity of fluid therein, a resonant phenomenon is established and a resulting sound of predetermined coherent frequency is produced.

BRIEF DESCRIPTION OF THE DRAWINGS

The invention will be more clearly understood from the following description of specific embodiments of the invention together with the accompanying drawings.

The following drawings represent an illustration of various physical methods of producing pipe extensional effects, water hammer, and other initiating means and are intended merely as representing examples of some of the methods for accomplishing same.

The broad scope of the present invention embodies means for producing a coherent expendable signal, and is not limited to any single method for producing sound.

The following drawings will also illustrate various portions of theoretical derivations of wave characteristics and calculations which attempt to show and justify conclusions reached herein.

Figure 9:
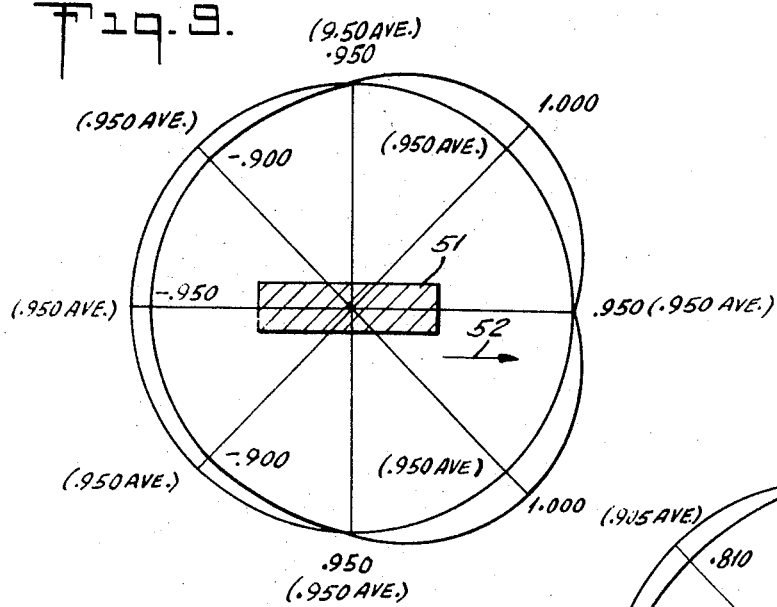
Figure 10:
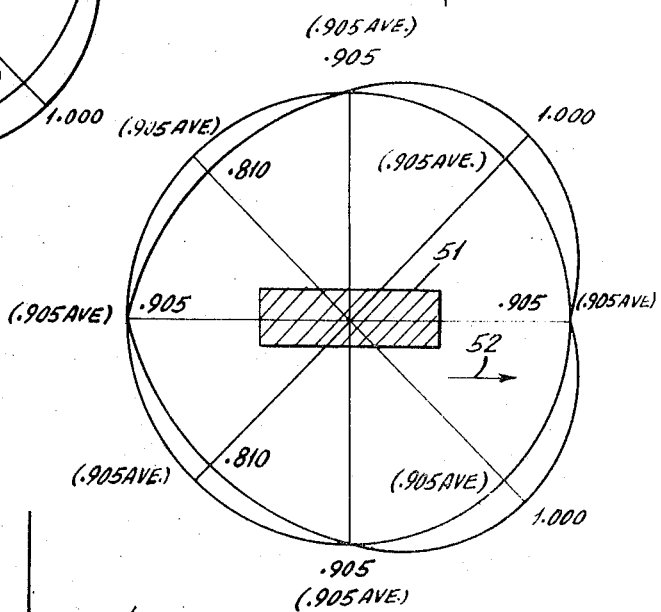
Figure 11:
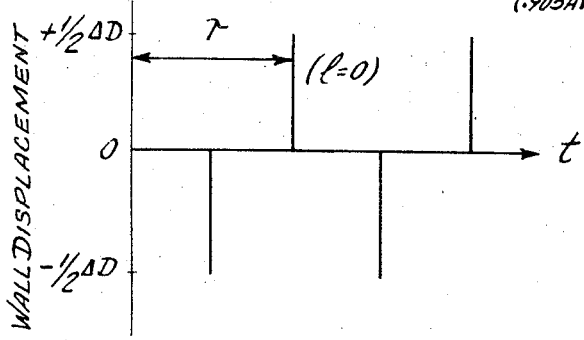
Figure 12:
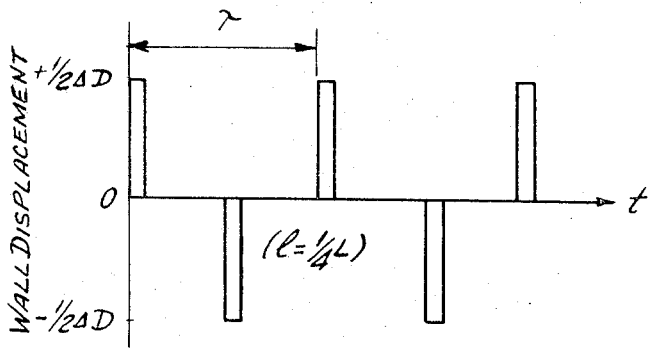
Figure 18:
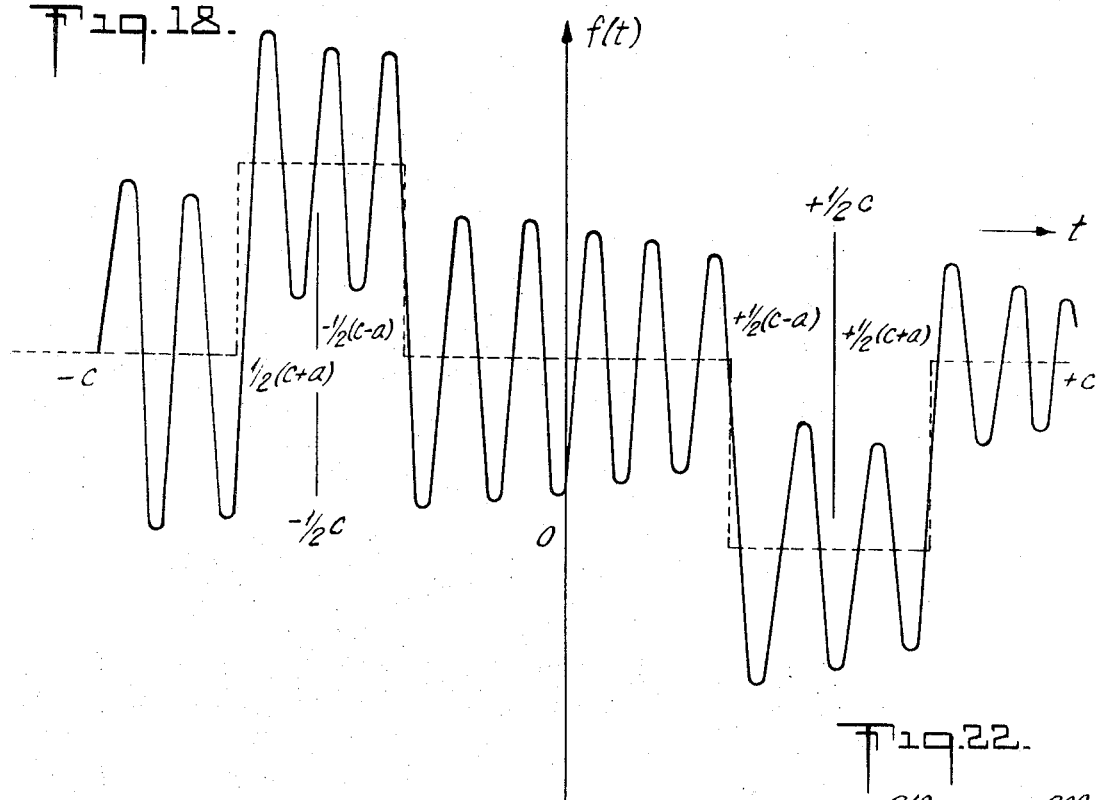
Figure 19:
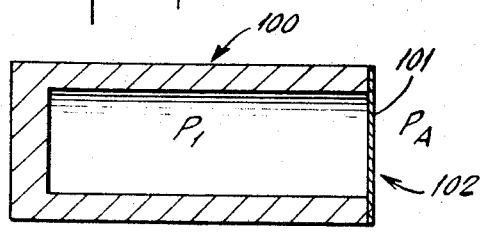
Figure 22:
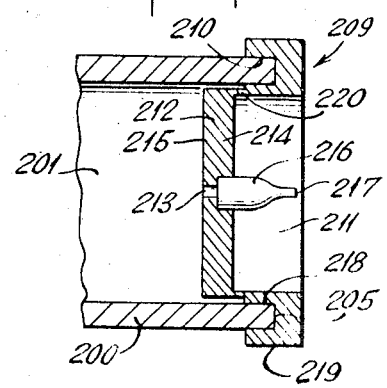
Figure 20:
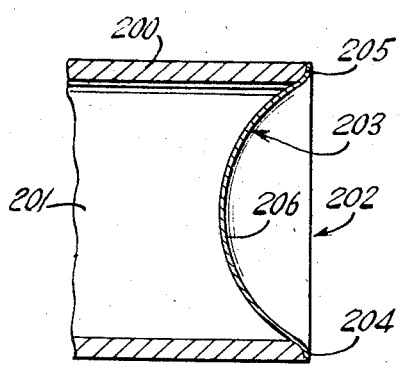
Figure 21:
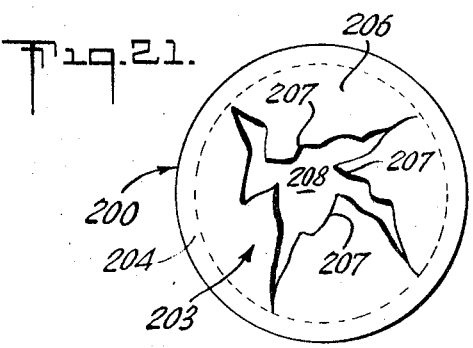
Figure 23:
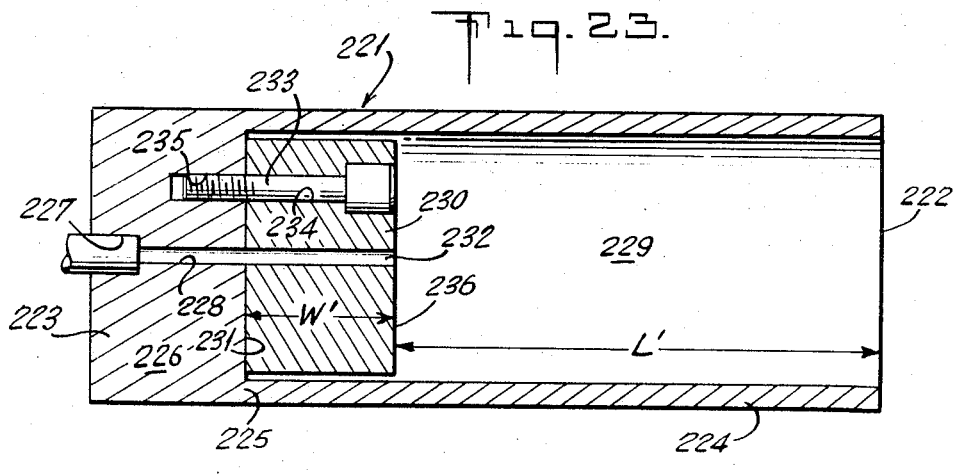
Figure 24:
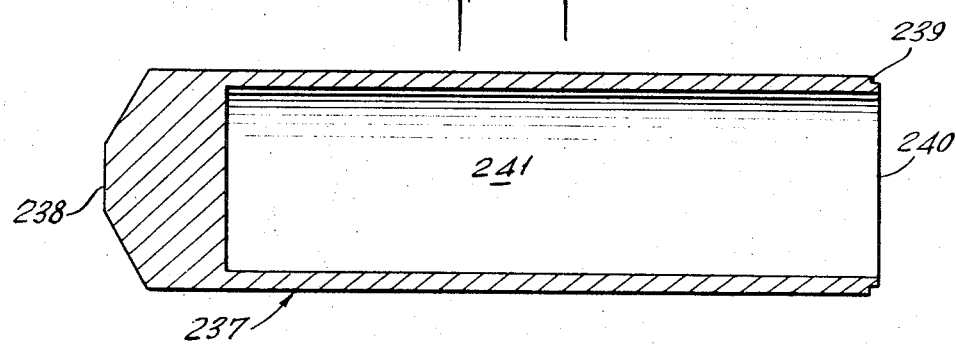
Figure 25:
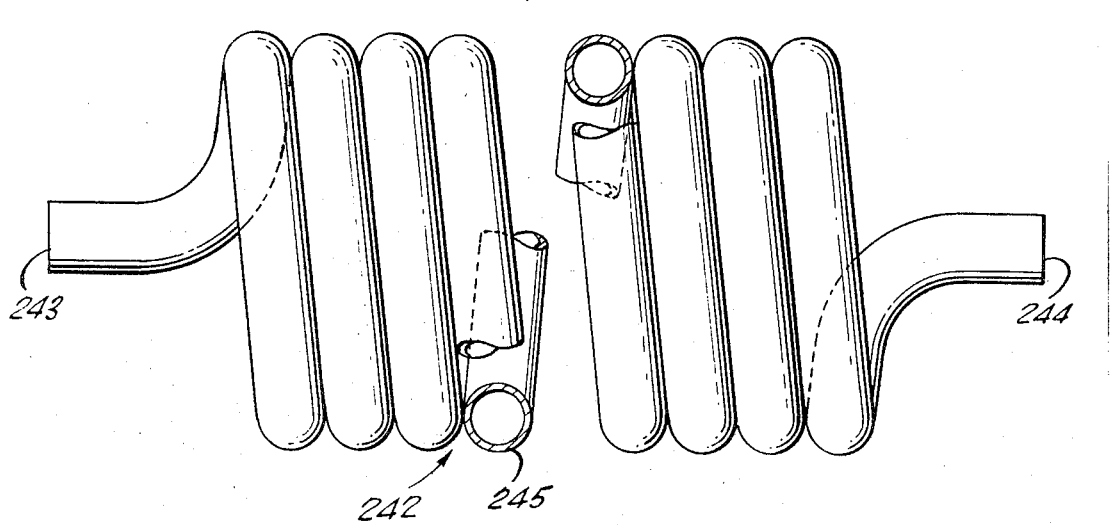

FIG. 1 is a sectional side view of an embodiment of the present invention;

FIG. 2 is a graphical presentation of pipe wall displacement versus time and axial position;

FIG. 3 is a partial sectional elevation of a pipe showing sonar compression waves;

FIG. 4 is a schematic view of a pipe sonar receiver;

FIG. 5 is a schematic view of a pipe sonar receiver similar to that shown in FIG. 4;

FIG. 6 is another schematic view of a pipe sonar receiver similar to that shown in FIG. 4;

FIG. 7 is a schematic view of a combined sonar transducer;

FIG. 8 is a graphical presentation of a compression wave;

FIG. 9 is a graphical presentation of relative voltage ratios and relative acoustic intensity ratio;

FIG. 10 is a graphical presentation of relative voltage ratios and relative acoustic intensity ratio;

FIGS. 11 to 16 are graphical presentations of pipe wall displacement versus time and axial position;

FIG. 17 is a graphical pressure wave;

FIG. 18 is a graphical presentation illustrating instantaneous closure when the real pipe walls are at a determined position from the open end;

FIG. 19 is a side sectional elevation view of a signal generator;

FIG. 20 is a fragmentary sectional elevation view of a pipe according to one embodiment of the present invention in which a conventional rupture disc has been affixed to the mouth thereof;

FIG. 21 is an elevation view looking into the mouth of the pipe of FIG. 20 after said conventional rupture disc has failed;

FIG. 22 is a fragmentary sectional elevation view of a pipe according to an embodiment of the present invention wherein a novel rupture disc of this invention has been inserted for operation into the mouth of the pipe;

FIG. 23 is a sectional elevation view of another embodiment of the present invention wherein constraint of the walls of the pipe is eliminated;

FIG. 24 is a sectional view of an embodiment of the present invention when used for impact location determination for ballistic vehicles;

FIG. 25 is a partial fragmentary elevation view of a helically formed pipe according to the present invention which facilitates the formation of relatively longer wave length sonar signals;

FIG. 26 is a fragmentary sectional elevation view of a helical form of the present invention which is readily machined and assembled;

FIG. 27 is a fragmentary sectional elevation view of a helical form of the present invention utilizing longitudinally extending chambers;

FIG. 28 is a fragmentary enlarged sectional elevation view of an entrance rupture disc trap for use with helical forms of the present invention;

FIG. 29 is a sectional elevation view taken along the line 29—29 of FIG. 27;

FIG. 30 is a fragmentary sectional elevation view of an embodiment of the present invention in which relatively accurate tuning of a secondary output frequency is achieved.

DESCRIPTION OF A PREFERRED EMBODIMENT

The present invention produces sound by means of the phenomenon known as water hammer. Water hammer is the effect which results from every change in steady state velocity in hydraulic pressure conduits, whether the change be gradual or sudden. It is a wave movement propagated with the velocity of sound in the fluid in the conduit, and is attenuated down to the sound steady state by dampening in the form of conduit friction.

The velocity of fluid within a conduit and pressure waves transmitted thereby are reflected back and forth in a section of pipe in which the water hammer occurs, and this section will "ring" until dissipating effects use up the energy. The frequency of the reflection, or the "ring" frequency, is determined by the wave velocity and pipe length.

While the water hammer is "ringing" in the pipe, the pipe expands and contracts at the same frequency in response to the pressure waves inside it. As the pipe walls oscillate radially, they will transmit energy to the external water surrounding the pipe, thus creating a sound source in the water. This conversion of mechanical energy in the oscillating pipe walls to sound energy comprises a dissipation of power which can be much greater than that due to internal conduit friction. If the wall thickness or modulus of elasticity becomes very small, the energy is dissipated very rapidly to the water or fluid external to the pipe. Conversely, if the wall thickness or modulus becomes very great, the energy is dissipated very slowly to the external water or fluid.

The requirements for a water hammer sonar source may be listed as follows:

(1) A pipe of a predetermined correct length to give the required frequency; of the predetermined and correct wall thickness, and Young's modulus to give the required decay time; the pipe having a predetermined diameter to give the required source strength.

(2) A surrounding medium of water of fluids, such as the ocean, to transmit the sound energy over predetermined distances.

The design parameters of the pipe mentioned in item (1) above will be found from an analysis described below. Item (2) above simply requires that the entire pipe be immersed in a body of water or fluid to be used as the sonar transmission medium.

Although the pipe may be energized by explosive, electrical, mechanical or other means to provide a desired pressurized condition therein, it is energized by explosive means in the preferred embodiment of the invention.

In FIG. 1, the pipe 1 may be a length of type 304 stainless steel tubing having an inside diameter D of 2.3 inches, a wall thickness B of 0.1 inch and an overall length L of 17.25 inches.

The pipe 1 has a closed end 2 and an open end 3. A small explosive charge 4 is utilized to pressurize the pipe. After the explosive charge is detonated, the water inside the pipe and the pipe wall 5 undergo periodic pressure and strain oscillations known as ringing, as hereinbefore described.

The periodic pressure waves which strain the pipe wall transmit energy to the ocean surrounding the pipe via the displacement of the pipe wall. The energy transmitted to the surrounding medium is the principal means of energy dissipation and causes damping of the ringing. The energy of the explosive charge is thus converted principally into a single frequency in the pipe and is then dissipated at said single frequency into the surrounding ocean thereby providing a narrow band acoustic source of high energy conversion efficiency.

The power, frequency or frequencies of the acoustic source are determined by the geometry of the pipe, such as its length L, its diameter D and its wall thickness $b$. The power and frequency of the acoustic source are also determined by the pipe material, such as the Young's modulus and elasticity thereof, and by the fluid medium or ocean, such as the bulk modulus and velocity of sound therein.

If the required frequency, pulse duration and power output are known, one or more pipe designs may be provided by the analysis hereinafter described. Conversely, if the pipe design is known, the complete frequency distribution, pulse distribution and cavitation power limit may be determined.

The sonar source of the present invention may be varied by an explosive charge, electrical discharges, mechanical impact devices, or interrupted water flow during free fall. The explosive charge device may utilize caps, primer cord or other forms of explosive starters. The sonar source of the present invention may be energized at its closed end 2, at its open end 3 or at an intermediate point in the pipe 1.

In an EER system application, a plurality of explosive actuators may be utilized at spaced intervals as the sonar source falls free through the water, thereby providing an acoustic pulse at a plurality of different depths. The narrow band signal permits reduction of the reverberation to signal ratio by pass band filtering and permits target Doppler processing and other signal processing which enhances the signal to noise ratio and provides range rate as well as range information.

If the sonar source of the present invention is designed to provide two or more frequencies of comparable magnitude, additional signal processing by frequency correlation may be utilized to further enhance the signal to noise ratio.

The analysis for the frequency of oscillation due to the water hammer or travelling of the water pressure wave back and forth along the inside of the pipe is as described in our co-pending application Ser. No. 635,141, filed May 1, 1967. The frequency, decay constant or pulse duration and power are expressed in terms of the pipe design parameters.

The sound waves produced in the external fluid by the water hammer in the conduit will be axisymmetrical because of the cylindrical geometry of the pipes. The sound source at any instant in time is a cylindrical ring around the pipe, of length as shown in FIG. 2 undergoing a displacement of expansion or contraction. This ring source travels down the pipe with a wave velocity less than that of the velocity of sound in the external fluid. A resulting wave front construction according to Hugen's principle shows that in the near field a conical wave is generated whose angle with the pipe may be represented by FIG. 3.

Referring now to FIG. 3, spherical waves W are confined within a boundary defined by conical compression wave front WF. The ring source is designated as 11. The waves W are produced when the explosive in the pipe (not shown in FIG. 3) is actuated.

The succession of compression and rarefaction conical sound waves generated by the pipe can be described as successive compression and rarefaction phenomenon. Thus, in the near field there are two conical sonic wave trains generated by the pipe. This near field may be used to compute the far field exactly. However, the far field will probably look more like radiation from a point source and generate almost isotropicly. In other words, the energy is generated principally in the radial direction.

The following is a list of parameters and variables together with their respective symbols:

$a$=wave velocity (or sound velocity) inside tube, ft. sec.$^{-1}$
$c$=sound velocity outside tube, ft. sec.$^{-1}$
$V$=flow velocity of fluid inside tube, ft. sec.$^{-1}$
$D$=diameter of tube, ft.
$\Delta D$=increase (or decrease) in tube diameter when expanded (or contracted), ft.
$L$=length of tube, ft.
$b$=wall thickness of tube, ft.
$\epsilon$=radial displacement of tube wall, ft.
$\mu$=radial velocity of tube wall, ft. sec.$^{-1}$
$f$=frequency, sec.$^{-1}$
$\omega$=angular frequency=$2\pi f$, sec.$^{-1}$
$W$=water density, lbs. ft.$^{-3}$
$g$=gravitational acceleration=32 ft. sec.$^{-2}$
$E$=Young's modulus of tube, lb. ft.$^{-2}$
$K$=volume modulus of compression of water, lbs. ft.$^{-2}$
$\gamma$=stress in pipe wall (tangential), lbs. ft.$^{-2}$
$t$=time after closing of valve, sec.
$P_1$=total water pressure in pipe, lbs. ft.$^{-2}$
$\Delta P$=change in water pressure in pipe, lbs. ft.$^{-2}$
$P_A$=acoustic pressure in external fluid, lbs. ft.$^{-2}$
$KE_0$=initial kinetic energy, or total energy, in water hammer, ft. lbs.
$KE$=kinetic energy, or total remaining energy at time $t$, ft. lbs.
$PE_p$=maximum potential energy in stretched pipe, ft. lbs.
$PE_w$=maximum potential energy in compressed water pipe, ft. lbs.
$E_{EXT}$=energy dissipated into external fluid in one complete pipe expansion (½ cycle)
$P_0$=initial sonic power radiated from pipe, ft. lbs. sec.$^{-1}$
$P$=sonic power radiated from pipe at time $t$, ft. lbs. sec.$^{-1}$
$I$=acoustic intensity, ft. lbs. sec.$^{-1}$ ft.$^{-2}$
$\alpha$=inverse decay time for power, sec.$^{-1}$
$\beta$=$D/b$, dimensionless
$P_a$=average sonic power radiated from pipe, ft. lbs. sec.$^{-1}$
$n$=number of water hammer pulses (valve closings) per second.

More than one pipe may be used to construct a transducer array which has greater power and more desirable directional properties than may be obtained with a single pipe.

Broad band capabilities, which are advantageous for some applications, may be obtained by cuting the open ends on a bias, and adjusting the lengths of individual pipes in the array so as to cover a given frequency band.

Applications of the sonar source of the present tinvention include:

(1) Sound source for "Kangaroo."—The probe is periodically dunked in the water at fairly high speeds, and some of this kinetic energy can be directly converted to sonic energy by the water hammer transducer.

(2) Submarine and surface ship sonar.—The ship's speed may produce enough water hammer energy in a pipe fixed to and external to the ship. The pipe might also be placed aft of the propellers and utilize the higher water velocity in this location. If neither of these approached is satisfactory, the pipe could be rotated in a circle, pipe axis tangent to the circle. This latter technique would also allow directional sweeping of the sound source by rotation of the plane of the circle. A fourth approach would be to keep the pipe stationary with respect to the ship and pump water through it; this would also allow directional sweeping.

(3) Helicopter sonar.—The pipe could be dragged through the water as the helicopter searched, in the same manner as any other transducer. In this case the helicopter supplies the energy to the pipe by towing it at relatively high speeds.

(4) Expendable sonar transducer (EST).—A pipe could be made into a hydrodynamically stable probe which free falls at a known speed through the water, maintaining the pipe in a vertical position, open end down. The valve action could be actuated by a propeller mounted on top of the probe. In this case, part of the potential energy the probe has at zero depth (water surface) is transformed into sonic energy as the probe sinks. The repetition rate of valve closure would be predetermined by propeller design and sink rate, and a sonic pulse could be generated at required depth intervals. This unit could be dropped by a ship or helicopters to measure transmission loss directly as a function of both depth and range. The ship's sonar would receive the signals from the probe, whose source strength would be of known, predetermined intensity. If the ship drops probes itself, they can be adjusted to initiate free fall at a given length of time after launching, by means of a simple, time dependent, flooding mechanism, thereby providing range control. This device should be inexpensive and highly reliable.

Cavitation near the surface (at water, pressures not much greater than 15 p.s.i.) generally occurs at acoustic power of ⅓ watt/cm.$^2$. In some applications, the acoustic power that can be generated by a pipe may be cavitation limited. However, if the acoustic power is generated in short pulses, the onset of cavitation is delayed, and the power level may not be cavitation limted. Since the pipe may be designed to provide extremely short pulse durations (as short as a few cycles in duration if required), the water hammer approach may provide a means of circumventing, at least to some extent, the cavitation limitation. Also, the pipe diameter may be decreased to reduce the power per unit area.

As for a sonar receiver, the pipe concept can be used in conjunction with an electro-acoustic transducer to provide much greater sensitivity (or gain) than could be obtained with the same electro-acoustic transducer by itself. This arrangement can be used in at least three different configurations shown in FIGS. 4, 5 and 6 in which an acoustic signal 21 is directed as shown.

There are two separate phenomena here. Firstly, the pipe will tend to store the energy from the acoustic wave train, and transmit it to the transducer. Secondly, very little energy will be stored or reach the transducer unless the pipe is normal to the acoustic wave front.

The incoming acoustic signal can be considered as a plane wave train containing $n=\tau f$ waves (where $\tau$ is pulse duration). If the pipe 22 is normal to the wave front (FIG. 4) any point on the pipe, at any time while the wave train is passing, will have the same pressure inside and outside (because the reflection phase will match the incident phase when pipe length is $\lambda/4$). After the wave train has passed, the energy stored in the pipe will be dissipated by friction, acoustic energy radiated from the pipe, and acoustic energy absorbed by the electro-acoustic transducer 23. If the pipe walls are very thick and rigid the energy dissipation through them will be slow; this will not affect the absorption of incoming energy since the pressure inside and out is always equalized, i.e., energy is absorbed by virtue of the pressure variations at the open end, thus if the electro-acoustic transducer is compliant, it will absorb most of the energy. The end result is that most of the energy incident on the cross sectional area of the pipe (same as electro-acoustic area) is absorbed by the electro-acoustic transducer. Secondly, if the pipe is not normal to the wave front, the acoustic waves will bounce off the walls inside the pipe and be distributed in phase; there will be no "ringing" effect and no energy storage, and little coherent energy will reach the transducer.

In FIG. 5, the walls must be very thin so that the acoustic wave 21 outside pipe 22 can couple energy into the fluid inside the pipe. Here the transducer receives energy directly over its area, while the rest of the energy comes from that part of the wave outside this area which couples to the pipe behind the transducer. Phase of the two power sources is optimal, i.e., compression will occur on both faces of the transducer in phase, and same for rarification.

In FIG. 6, the comments on FIG. 4 apply to pipe 22 facing the signal 21; it should have a thick wall, and absorb most of the energy incident on its open end. The comments on FIG. 5 apply to the pipe behind the transducer; it should have a thin wall and absorb the acoustic energy from outside the circular area of the transducer. Again, the pressure on both sides of the transducer is in phase. This model should yield greatest energy efficiency.

In the combined electro-acoustic and pipe transducer embodiment the pipe, or water hammer concept may be implemented by using an electro-acoustic transducer as the power source for the water hammer. This could achieve two different things, a method of circumventing the cavitation limitation, which is sometimes a problem; and a method of lengthening the sonar pulse if so desired. (See FIG. 7.)

The pulse length can be increased by adjusting the wall thickness, so that the decay time of the pipe, $\alpha-1$ is much greater than the pulse duration of the transducer. The caviation problem can be improved upon, since the ratio of pipe area to transducer area is $\lambda/D$.

Referring to FIG. 7 a pipe 31 contains a power source 32 and an electro-acoustic transducer 33.

In some cases, caviation may occur in the fluid inside the pipe at the transducer face. In this event, a modification of FIG. 7 which sealed the opened end and doubled the pipe length to $\lambda/2$ could be an advantage. The enclosed water would not be easily susceptible to cavitation.

In computing values of parameters for a line source, FIG. 8 is referred to in which wave front 41 intersects pipe axis 42 at angle $\theta$, and in which arrow 43 designates the direction of wave motion in the pipe.

FIG. 9 illustrates the relative voltage ratio or acoustic pressure ratio of water pipe 51, where arrow 52 designates the direction of wave motion in water pipe 51. Similarly, FIG. 10 illustrates the relative acoustic intensity ratio.

One can use ship motion to push water directly into pipes, or one can use it indirectly in a ducted system where the water flow is carried to the pipes.

One can also measure total energy output of a pipe by enclosing the pipe and embedding a hydrophone in a wall of a sealed chamber having rigid, non-transmitting walls. In principle, the enclosure acts like a cavity in which the acoustic intensity becomes uniform, and energy absorbed by the hydroplane is proportional to hydrophone area. The remainder of energy is dissipated in the water and through wall friction.

The effect of the finite time required for the wall of a pipe according to the present invention to expand to max. diameter as the pressure wave passes, and conversely to shrink to minimum diameter as the rarifaction wave passes, is to round off the square wave pictures shown in FIGS. 11–15.

Since the open end reflects the pressure wave instantly, the wall near the open end will undergo no displacement. In the case under consideration the pipe is 15″ long, confined to the distance from wave leading edge to maximum displacement of 3″ (see FIG. 2); or, equivalently, it takes 1/20 ms. for wall to fully expand, while it takes 1/2 ms. for pressure wave to make one round trip (twice the length of the tube) in 1/2 $\tau$.

The result is that the square waves shown in FIGS. 11–15 are rounded off, as shown in FIG. 16.

FIGS. 17 and 18 show graphically a pressure wave and its characteristics upon pipe valve closure.

FIG. 19 shows a housing in the form of a hollow tube assembly 100 having a rupture disc 101 sealing end 102 thereof. $P_1$ designates the pressure within assembly 100, while $P_A$ designates the ambient pressure. In one embodiment, internal pressure $P_1$ may be one atmosphere or a vacuum, and $P_A$ will be hydrostatic pressure which is a function of the depth below the surface of the fluid being utilized.

Upon $P_A-P_1$ reaching a predetermined value, rupture disc 101 will fail, causing a fluid column to enter assembly 100 and producing water hammer in the case of proper design characteristics of assembly 101.

Rupture disc 101 may be plastic, concave, convex, notched, metal, ceramic, etc. This embodiment uses ambient hydrostatic pressure as an energy source as well as a control mechanism.

DESCRIPTION OF OTHER PREFERRED EMBODIMENTS OF THE PRESENT INVENTION

Referring now to FIG. 20 of the drawings, an elongated pipe 200 is shown in fragmentary sectional view as having an interior chamber 201 ending in a mouth portion 202. For purposes of illustration, a conventional type rupture disc 203 having an annular lip 204 is shown positioned within mouth 202 of pipe 200 such that lip 204 engages end 205 of the pipe. Disc 203 may be of a type used for other applications known to the mechanical arts and is secured, such as by welding or bonding to pipe 200. As will be seen, conventional disc 203 yields undesirable results upon failure since concave portion 206 will fracture on loading in an indeterminable fashion with varying effective open areas upon the disc being subjected to identical hydrostatic loading.

FIG. 21 shows pipe 200 with disc 203 after rupture of the latter. Uneven and jagged edges 207 bound a restricted opening 208 which is hardly suitable for permitting entry of a uniform column of water or other fluid into pipe 200. The result of using conventional rupture discs in attempting to accomplish the novel results of the present invention is the entry of a turbulent mass flow rate of fluid with an uneven pressure profile at the leading edge of the fluid column. The transfer of the kinetic energy of this moving uneven column into potential energy to be stored by the walls of the pipe 200 cannot be as efficient as that transfer accomplished with the novel rupture disc according to the present invention as described below.

FIG. 22 shows a disc assembly 209 fitted into the mouth or end of pipe 200, for example. The annular end 205 of pipe 200 is firmly and snugly fit into annular recess 210 and a suitable fluid-tight joint may be made by sweat brazing or by welding, thereby enabling isolation of the atmosphere within pipe 200 from the environment external of the pipe. A cavity 211 within disc assembly 209 is bounded at one end by a frangible-linked rupture plate 212. Plate 212 is formed with a counter bore 203 therethrough and extending at a larger diameter from face 214 of plate 212 to the smaller diameter of counterbore 213, which communicates with face 215 of the plate. A copper pinch tube 216 is secured, as by welding or brazing into the larger diameter portion of counterbore 213 such that its inner diameter communicates with chamber 201 of pipe 200. Pinch tube 216 includes a portion 217 which extends away from cavity 211 to vacating means, not shown, so that a vacuum may be pulled on chamber 201 and portion 217 thereafter pinched to hold this vacuum. One reason for using the apparatus of FIG. 22 with pipe 200 vacated is that the presence of air or gas within chamber 201 will compressibly cushion the impact of plate 212 at the end of its stroke, altering the energy transfer properties. A neck portion 218 of disc assembly 209 interconnects ring 219 and fracture rib 200, which rib is connected to plate 212. The cross sectional area of fracture rib or ring 220 is predetermined and suitably molded or machined such that it will fail in tension upon its being subjected to ultimate tensile stresses which, in turn, are a function of the allowable stress properties of the disc material being employed.

In operation, pipe 200 is vacated via pinch tube 216 and the entire assembly is deployed from a vehicle, such as a ship under way. Since the density and specific gravity characteristics of the assembly result in its exhibiting negative buoyancy in sea water, for example, the assembly will descent or fall. During this descent the hydrostatic pressure within cavity 211 and upon face 214 will constantly increase linearly as a function of depth, thereby creating a pressure differential across plate 212 with a resulting constant increase in magnitude of tensile stress in fracture ring 220. At a predetermined depth, the tensile stresses will reach a designed failure value and rib 220 will fail, thereby releasing plate 212 in the path of a column of water which will plummet down the length of pipe 200 with plate 212 immediately ahead of the column. The sea provides an infinite source of energy at the design depth and the sudden kinetic energy of the moving water column will be converted into potential energy stored within the walls of pipe 200 upon impact of the plate 212 and water column against the closed end opposite end 205. Thereafter, an exchange of energy between the water column and the walls of the pipe at resonant frequencies result in the emitting of a coherent sonar signal from the pipe 200. It is to be emphasized that the phenomenon exhibited is that of water hammer, not of a simple shock wave or wave having nothing more than noise output.

FIG. 23 shows yet another embodiment of the present invention wherein undesirable end constraint of pipe walls is eliminated. Where, for example, it is desirable to thicken the end of the pipe of the present invention so that secondary frequencies are not produced by the separate and distinct resonance of the end wall itself, as would occur where the end wall was made thin of a desired thickness, an accompanying problem might result. The juncture of the thick end wall and the relatively thin pipe wall produces a fairly rigid joint and resulting constraint of the pipe wall such that the circumferential wall at this joint is unable to expand and contract with the flexibility of the wall not so constrained. The transfer of energy will be uneven along the pipe wall, for this reason. In FIG. 23, a pipe 221 is shown with open end 222 opposite closed end 223. Circumferential pipe wall 224 extends longitudinally between end 222 and juncture 225 between wall 224 and thick cap portion 226. Cap portion 226 has a counterbore of larger diameter opening 227 communicating with smaller diameter opening 228 through end 223 such that chamber 229 communicates with the atmosphere outside pipe 221 through cap portion 226. An insert 230 is located within chamber 229 adjacent face 231 of cap 226 and has a bore 232 formed therethrough. Suitable conventioinal fasteners, such as headed bolts 233 hold insert 230 against face 231 and are disposed within counterbored recesses 234 in insert 230 and matingly engage tapped holes 235 in cap portion 226. Inserts of varying thickness W' may be used to vary the distance L' between face 236 of insert 230 and the open end of pipe 221. Length or distance L' determines the wavelength of the sonar signal produced by water hammer with the novel apparatus of the present invention, as previously described in the aforementioned figures. By varying distance L' with different inserts, a variety of signals may be produced with a relatively inexpensive apparatus, and universality of structure is achieved. Pipe 221 may be fitted at its open end 222 with a rutpure disc of the present invention and a copper pinch tube as already described may be inserted into large diameter portion 227 of the counterbore through cap 26.

An important feature of the apparatus shown in FIG. 23 is the fact that wall 224 is relatively resilient and not constrained over the entire length or distance L' since the juncture 225 is removed from face 236 of insert 230 a distance W', or the thickness of the insert. The aforementioned problems resulting from constraint are thereby eliminated.

FIG. 24 shows a pipe arrangement suitable for use as a missile. Assembly 237 is formed of a diameter suitable for loading into the nose of an intercontinental ballistic missile, for example, which may be launched from beneath the surface of the ocean only to return to the ocean. Nose 238 of assembly 237 is constructed for strength upon impact against the target or object to be struck. Annular groove 239 formed in end 240 of the pipe may be fitted with a closure attachment within the scope of the present invention. Chamber 241 of assembly 237 is of a length which will produce a sonar signal of wavelength depending thereupon.

Applications arise where a relatively long wavelength signal must be produced. Particular use of a long wavelength sonar signal would occur where the party originating or producing the signal would not want to be detected by an enemy submarine, for example. If the wavelength of the sonar signal is long enough, the physical geometry of the enemy submarine would preclude its being able to receive and identify same without the use of external transducers. The use of such transducers would benefit the originator of the signal since the location of the enemy sub could be established. Without the transducers, the actual length of the enemy submarine would not be long enough to enable the enemy to utilize and identify the signal characteristics. On the other hand, the shore installation of the friendly originator of the signal could be of such length that a tracing of the location of each vessel deploying sonar apparatus of the present invention may be accomplished. Thus, the precise location of each ship of a submarine fleet, for example, could be established without the enemy having this information.

FIG. 25 shows a low frequency, long wavelength apparatus wherein the desired length of pipe needed for a selected frequency is wound in a helix assembly 242 having ends 243 and 244. The pipe 245 of the assembly may be preselected insofar as diameter, wall thickness, material, heat treatment and number of turns is concerned. As in the case of the simple pipe arrangements shown in FIGS. 20–24 for high frequency applications, water or fluid having known modulus of compressibility travels very rapidly through the pipe until its path is obstructed, whereupon its kinetic energy is converted into resonant vibration of the pipe wall. Either of ends 243 or 244 may be fitted with a closure cap or a rupture disc trap to be described below.

In FIG. 26 a helical structure similar in principle to that disclosed in FIG. 25 is shown wherein assembly 245 includes an outer pipe 246 within which a machined worminsert 247 formed with helical teeth 248 defines a chamber 249 which follows a helical path between adjacent ones of said teeth spaced along a predetermined pitch circle. The chamber 249 ends in hollow 249a adjacent plug portion 250. Worm insert 247 may be welded or brazed into pipe 246 such that a fluid-tight seal between chamber 249 and the external part of assembly 245 is maintained. An entrance plate 251 is secured within end 252 of assembly 245 and is formed with an opening 253 therethrough. A rupture disc trap 254 is secured within opening 253. Referring to FIG. 28 trap 254 is shown in more detail. A housing 255 has a closed end 256 and an open end 257 into which a rupture disc assembly such as that designated numeral 209 and described for FIG. 22. Housing 255 is formed with an internal chamber 258 having a tapered portion 259 of gradually reducing diameter progressing toward end 256. End 256 is formed with a counterbore 260 therethrough which serves a dual purpose. Firstly, pinch tube, such as the copper type already described as numeral 216 is disposed in the counterbore for vacation of chamber 258. Secondly, upon rupture of fracture ring 220, plate 220 will be propelled toward end 256 until it wedges itself in tapered portion 259, the gas or air, if any, traveling ahead of propelled plate 220 being forced out pinch tube 216. Numeral 212a designates plate 212 after being wedged in tapered portion 259.

Tube portion 261 of assembly 254 is that projection of the assembly which is secured into entrance plate 251 in FIG. 26. In operation, upon failure in tension of fracture ring 220, plate 212 is propelled into the wedged position shown in phantom, thereby making a clear and unobstructed path for water to enter end 257 of assembly 254 and to thereafter pass through tube portion 261 and thence into whatever structure assembly 254 has been adapted to.

The novel rupture disc assembly of the present invention is to be distinguished from prior art discs in that upon failure of the fracture ring, substantially one hundred percent of the pipe mouth area is free and unobstructed for passage of fluid therethrough.

FIG. 27 shows a still further embodiment of the present invention for producing low frequency and long wavelength sonar signals wherein an assembly 262 includes an outer pipe 263 and a machined or molded insert 264 having radial stationary vanes or ribs 265 defining chambers 266 each of which communicates with inlet port 267. Ribs 265 for longitudinally extending passageways for the fluid entering assembly 262, chambers 266 being connected by curvilinear conduits 268.

Finally, FIG. 30 shows in a sectional view a portion of the water hammer assembly according to the present invention in connection with an exchangeable tuning member for accurate turning of a secondary sonic frequency. In the shown embodiment, the rupture disc pipe 270 is closed at one end thereof by a solid plate 274 of the pipe by screws 273 and sealed by means of a gasket 275. In the center of the plate 274, there is provided a tapped hole 278 for receiving a threaded projection 277 extending from an exchangeable weight member 276. The mass of the weight member 274 is adjusted so as to produce a secondary resonant vibration in the body of the water hammer pipe assembly.

The embodiments of the invention particularly disclosed are presented merely as examples of the invention. Other embodiments, forms, and modifications of the invention coming within the proper scope of the appended claims will of course readily suggest themselves to those skilled in the art.

What we claim is:

1. In the method of producing sonar vibrations with the air of conduit means, the steps of causing fluid within conduit means of a predetermined size to acquire kinetic energy of a predetermined magnitude, deriving from said kinetic energy during a predetermined time interval a predetermined amount of energy, causing said derived kinetic energy to be converted into potential energy which is stored by said conduit means, resonating said conduit means in response to said converted potential energy, and deriving from said conduit means sonar vibrations.

2. A method of producing a coherent vibrational signal, comprising the step of permitting fluid at a first pressure to enter pipe means at a second pressure.

3. In an apparatus for producing a coherent vibrational signal, a frangible disc assembly including failure means for initially substantially maintaining a fluid tight seal across the mouth of a conduit and finally substantially instantaneously providing about 100% opening of said mouth, said disc assembly comprising an annular ring portion formed with an annular groove adapted to receive the end of a pipe therein, the inner diameter walls of said ring defining side portions of a cavity, a piston plate of cylindrical shape having a diameter smaller than the inside diameter of the pipe and being disposed coaxially therewithin, and a relatively thin walled frangible ring portion interconnecting said annular ring portion and the piston plate.

4. In an apparatus according to claim 3, wherein said piston plate is formed with an opening therethrough.

5. In an apparatus according to claim 4, further comprising a pinch-type tube the end of which communicates with said opening.

6. A frangible disc assembly, comprising means for covering the end of a conduit, and failure means for substantially instantaneously opening substantially 100% of said end, said cover means including an annular ring portion formed with an annular groove adapted to receive the end of the pipe, the inner diameter walls of said ring portion defining side portions of a cavity, and a piston plate of cylindrical shape having a diameter smaller than the inside diameter of the pipe and being disposed coaxially therewithin.

7. A frangible disc assembly according to claim 6, wherein said failure means includes a relatively thinwalled frangible ring interconnecting said annular ring and the piston plate.

References Cited

UNITED STATES PATENTS

| | | | |
|---|---|---|---|
| 3,039,559 | 6/1962 | Ellsworth | 181—.5XC |
| 3,077,944 | 2/1963 | Padberg, Jr. | 181—.5H |
| 2,407,093 | 9/1946 | Mohaupt | 181—.5C2 |
| 2,549,464 | 4/1951 | Hartley | 181—.5X |
| 2,601,522 | 6/1952 | Heiland et al. | 181—.5C2 |
| 2,740,946 | 4/1956 | Geneslay | 340—8UX |
| 2,804,603 | 8/1957 | Harris | 340—11 |
| 2,962,695 | 11/1960 | Harris | 340—11X |
| 3,320,581 | 5/1967 | Sims | 340—10 |
| 3,370,186 | 2/1968 | Antonevich | 340—10X |
| 3,378,814 | 4/1968 | Butler | 340—10X |

RICHARD A. FARLEY, Primary Examiner

B. L. RIBANDO, Assistant Examiner

U.S. Cl. X.R.

181—.5